(12) United States Patent
Copeland

(10) Patent No.: US 11,423,181 B2
(45) Date of Patent: Aug. 23, 2022

(54) DISTRIBUTED AND AUTONOMOUS DATA SECURITY AGENT

(71) Applicant: Scott R. Copeland, Pasadena, TX (US)

(72) Inventor: Scott R. Copeland, Pasadena, TX (US)

(*) Notice: Subject to any disclaimer, the term of this patent is extended or adjusted under 35 U.S.C. 154(b) by 0 days.

(21) Appl. No.: 16/876,003

(22) Filed: May 16, 2020

(65) Prior Publication Data

US 2020/0356702 A1 Nov. 12, 2020

(51) Int. Cl.
*G06F 21/78* (2013.01)
*G06F 21/57* (2013.01)
*H04L 9/40* (2022.01)
*G06F 21/62* (2013.01)

(52) U.S. Cl.
CPC ............ *G06F 21/78* (2013.01); *G06F 21/572* (2013.01); *G06F 21/6218* (2013.01); *H04L 63/0272* (2013.01); *H04L 63/30* (2013.01); *G06F 2221/2121* (2013.01)

(58) Field of Classification Search
CPC ....................................................... G06F 21/78
See application file for complete search history.

(56) References Cited

U.S. PATENT DOCUMENTS

| 2014/0164776 A1* | 6/2014 | Hook | H04L 9/3247 |
| | | | 713/171 |
| 2021/0157312 A1* | 5/2021 | Cella | G05B 23/0291 |

* cited by examiner

*Primary Examiner* — Simon P Kanaan
(74) *Attorney, Agent, or Firm* — Sherman D. Pernia, Esq.

(57) ABSTRACT

The present invention is a distributed and autonomous digital data security agent that secures stored data and the storage device itself, from remote manipulation. The present system is an "agent" in that it acts independently in the accomplishment of its objects and is distributed in that its functionality is resides on firmware resident at disparate hardware locations. The agent is autonomous in that it cannot be remotely compromised. The system includes server having a dedicated Private link with a Chip Administrator, and a Data Link between a first-Chip, a second-Chip of said security agent. The first-Chip is resident and operable to control Write/Read calls and data transfers between the server and the second-Chips of the data storage. The Chip Administrator, first-Chip and second-Chip in combination with their associated Firmwares provide said distributed and autonomous data security agent.

1 Claim, 9 Drawing Sheets

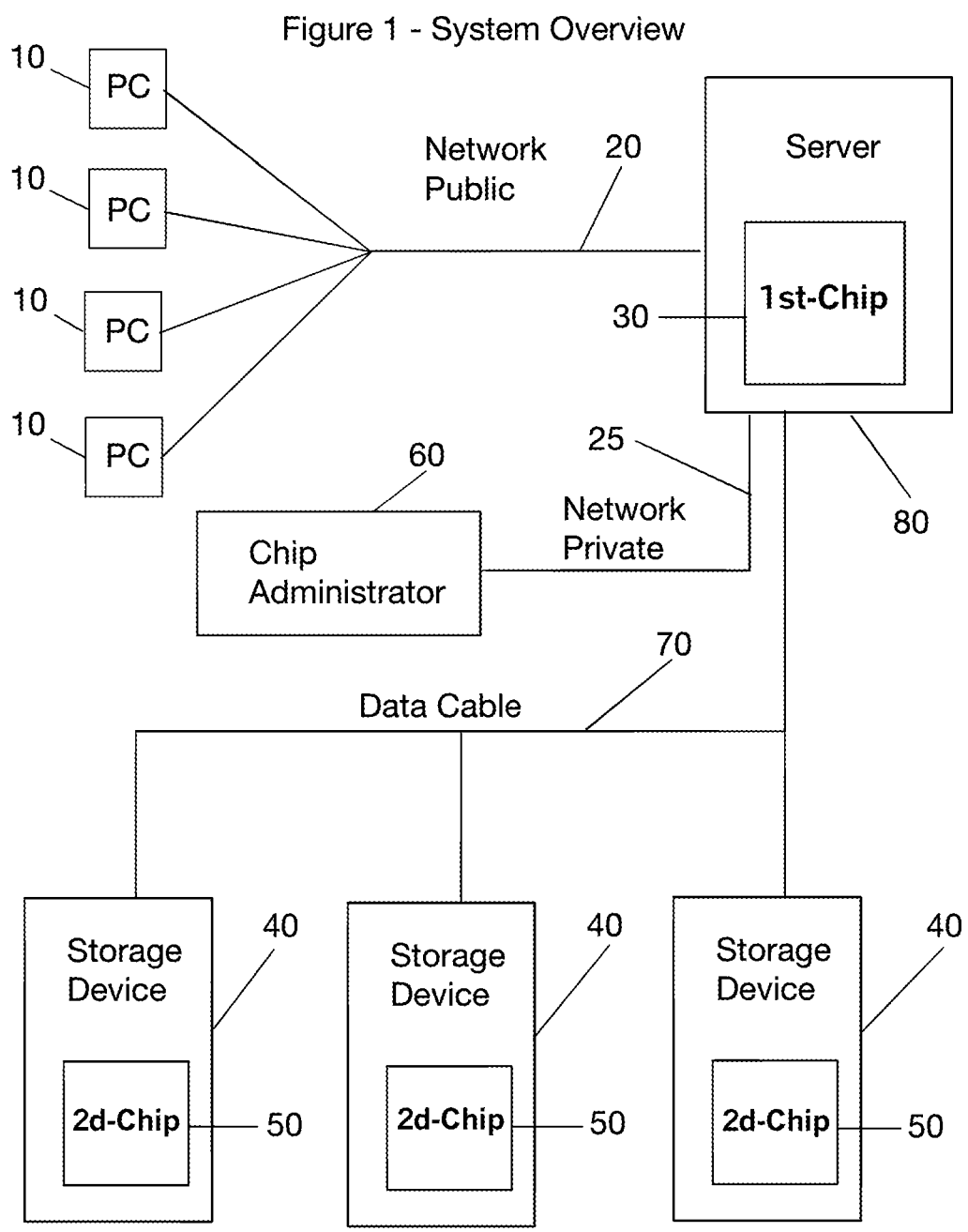
Figure 1 - System Overview

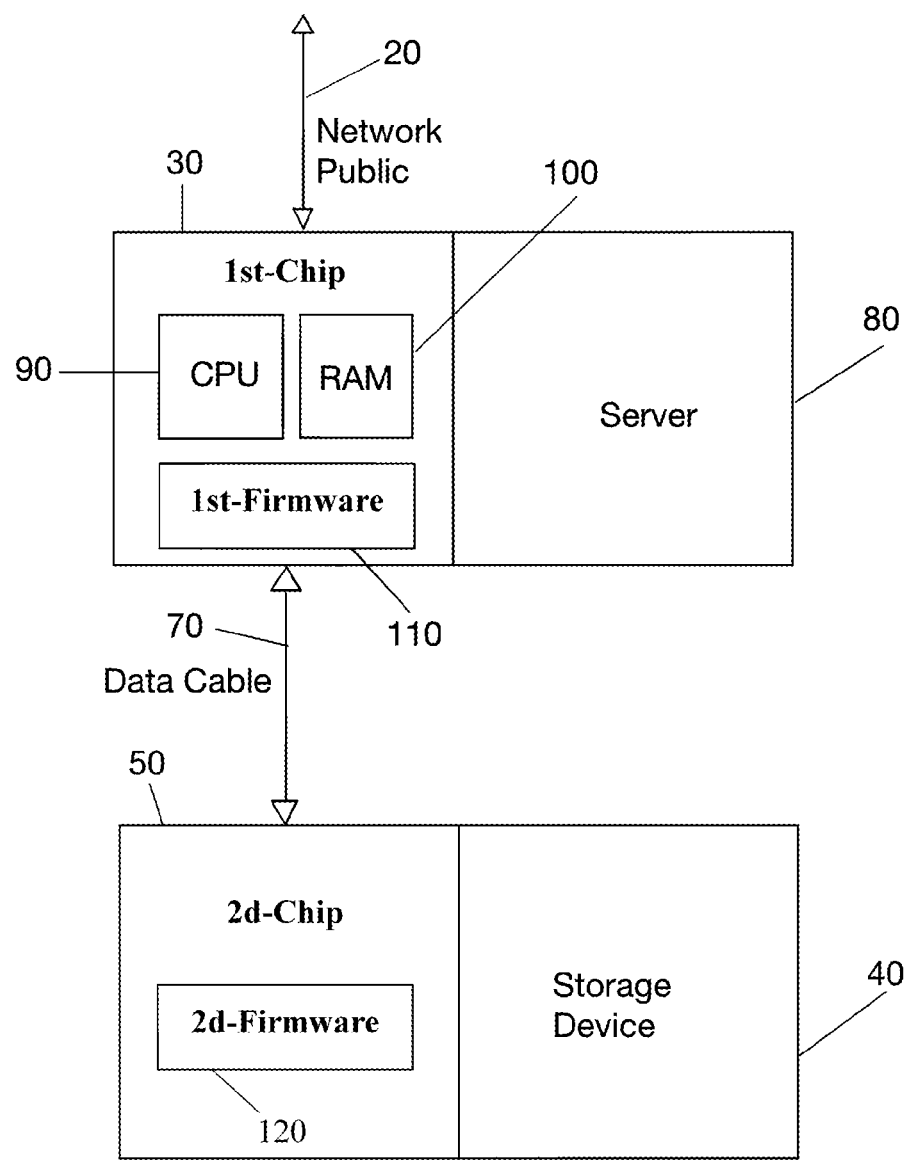

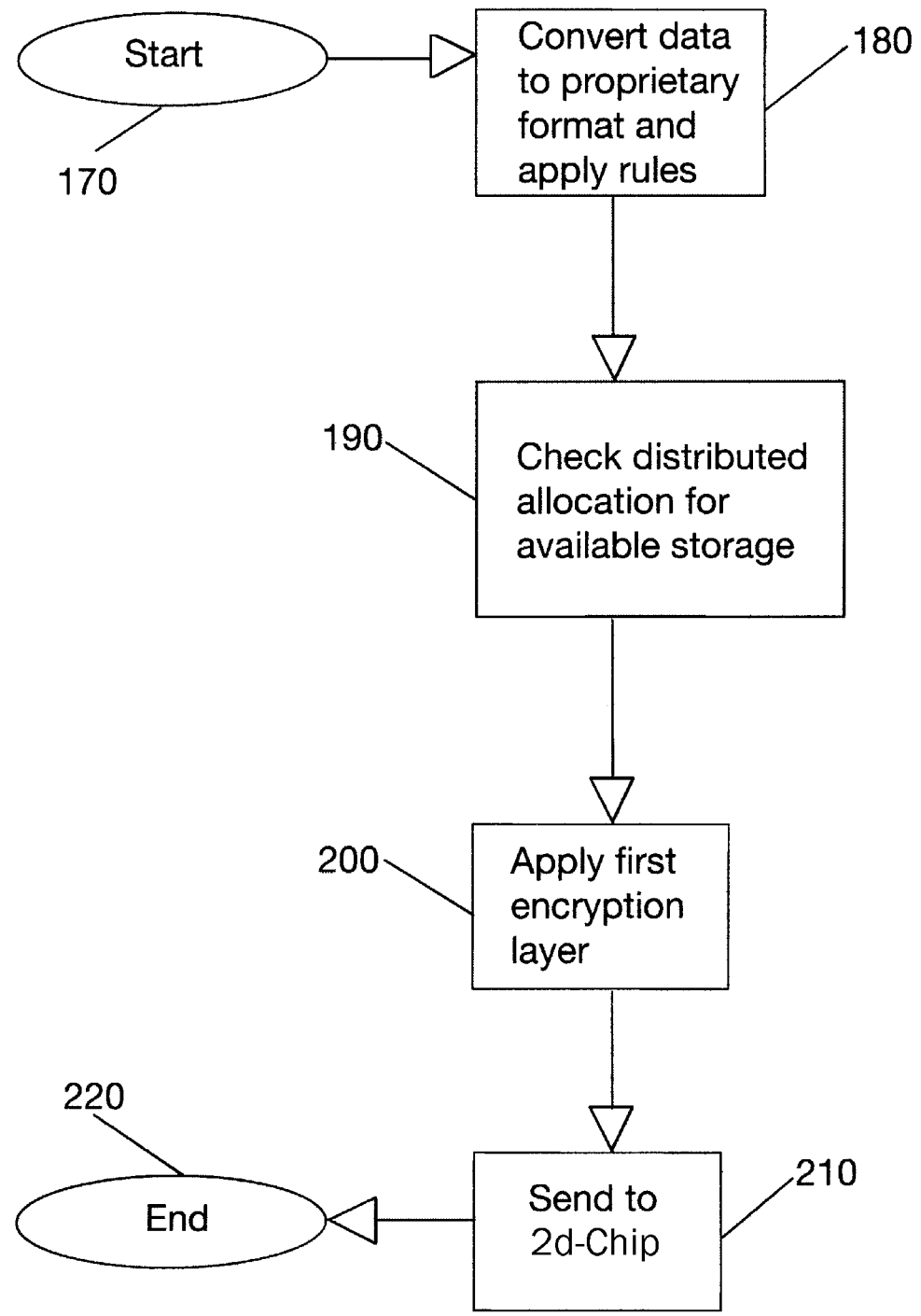

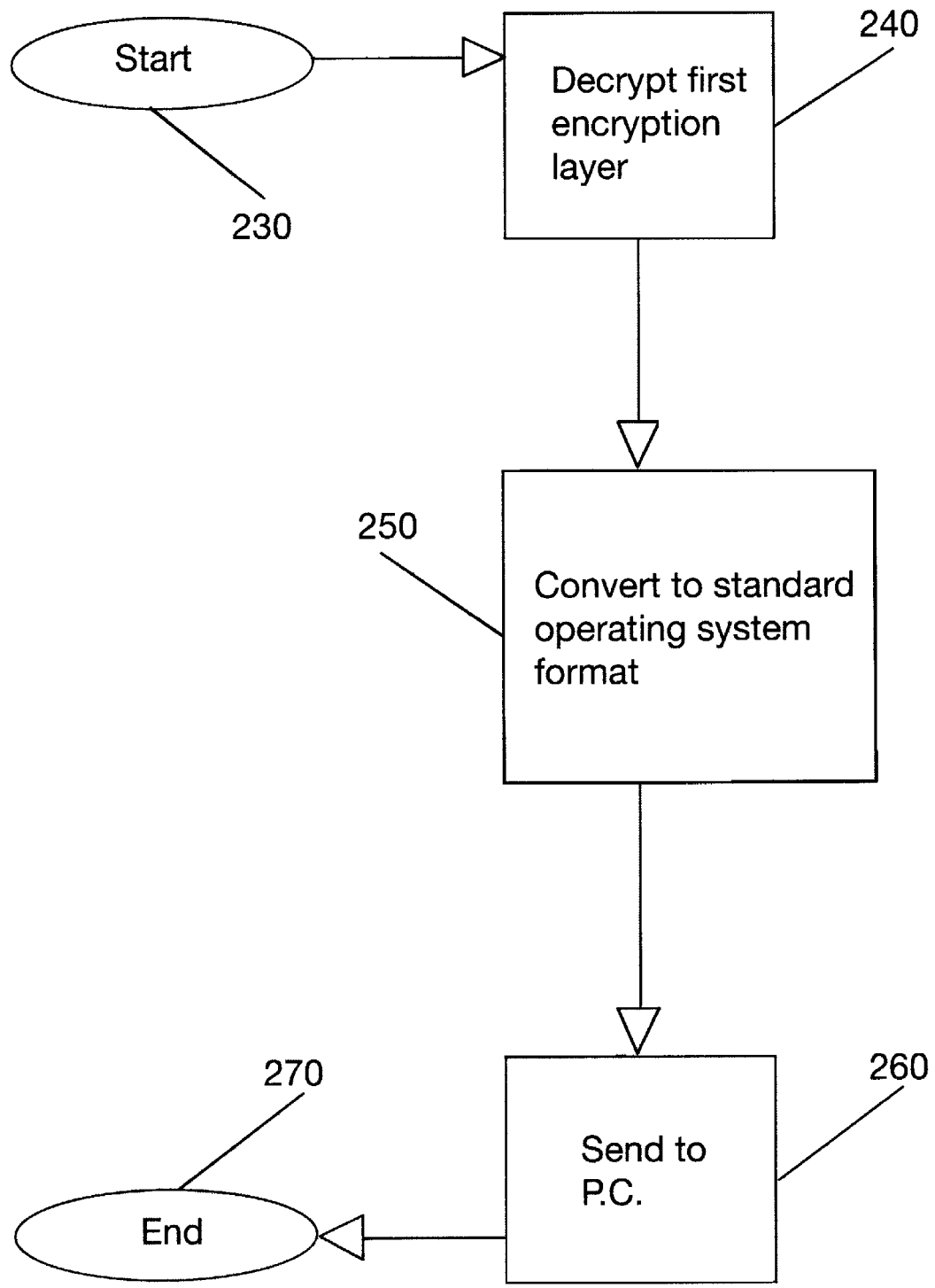

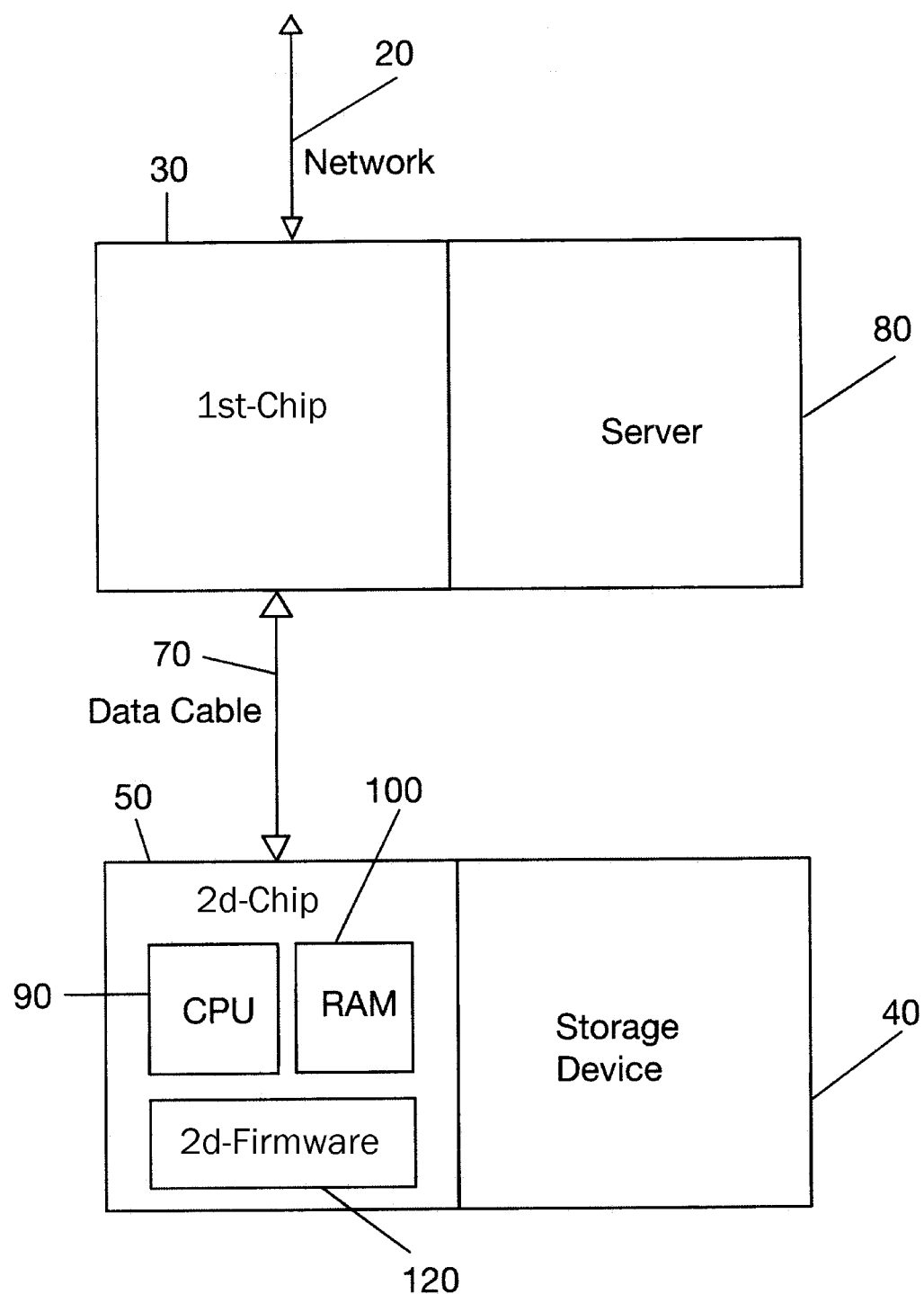
Figure 4 - Second-Chip

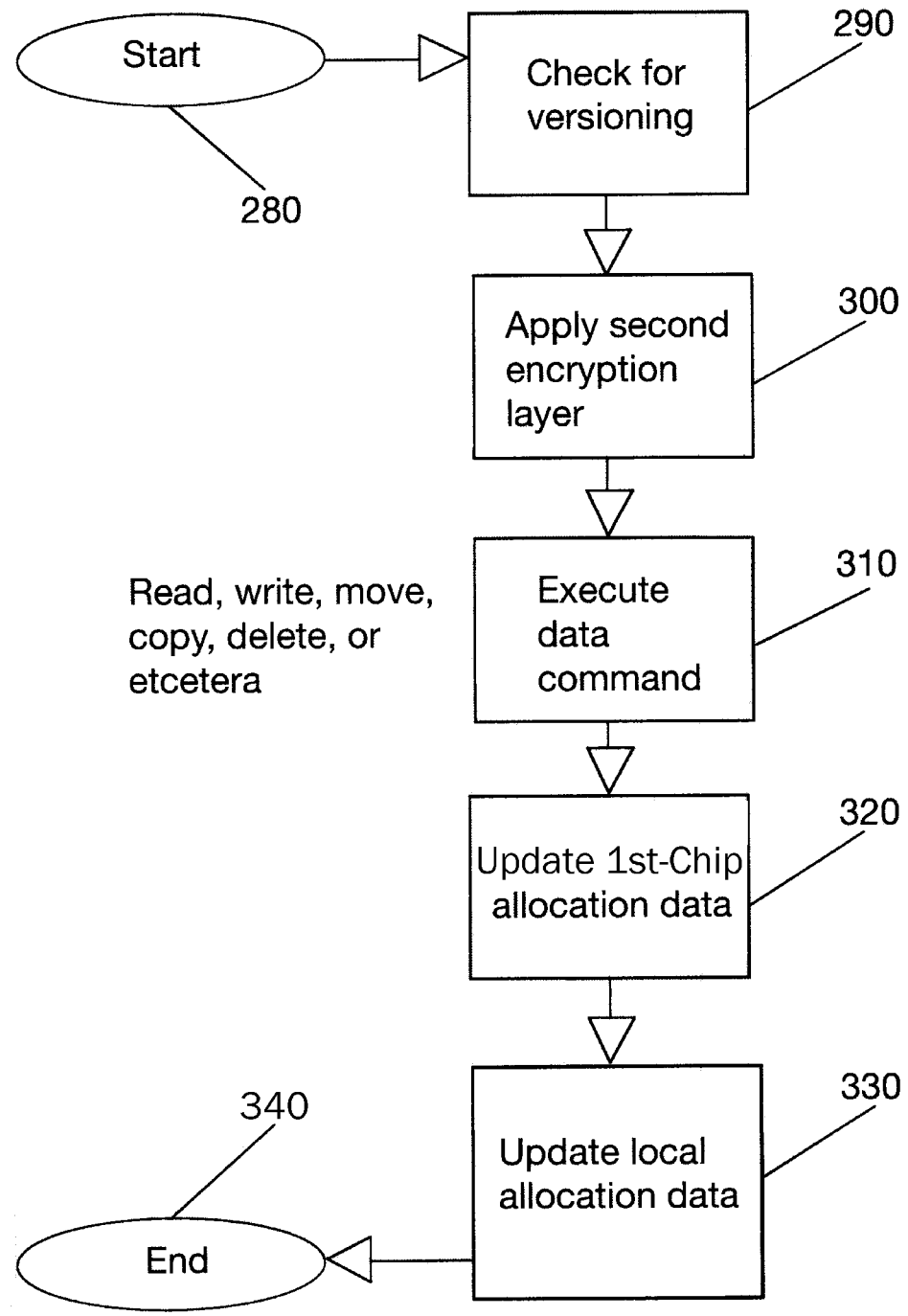
Figure 5a - 2d-Chip Input Logic

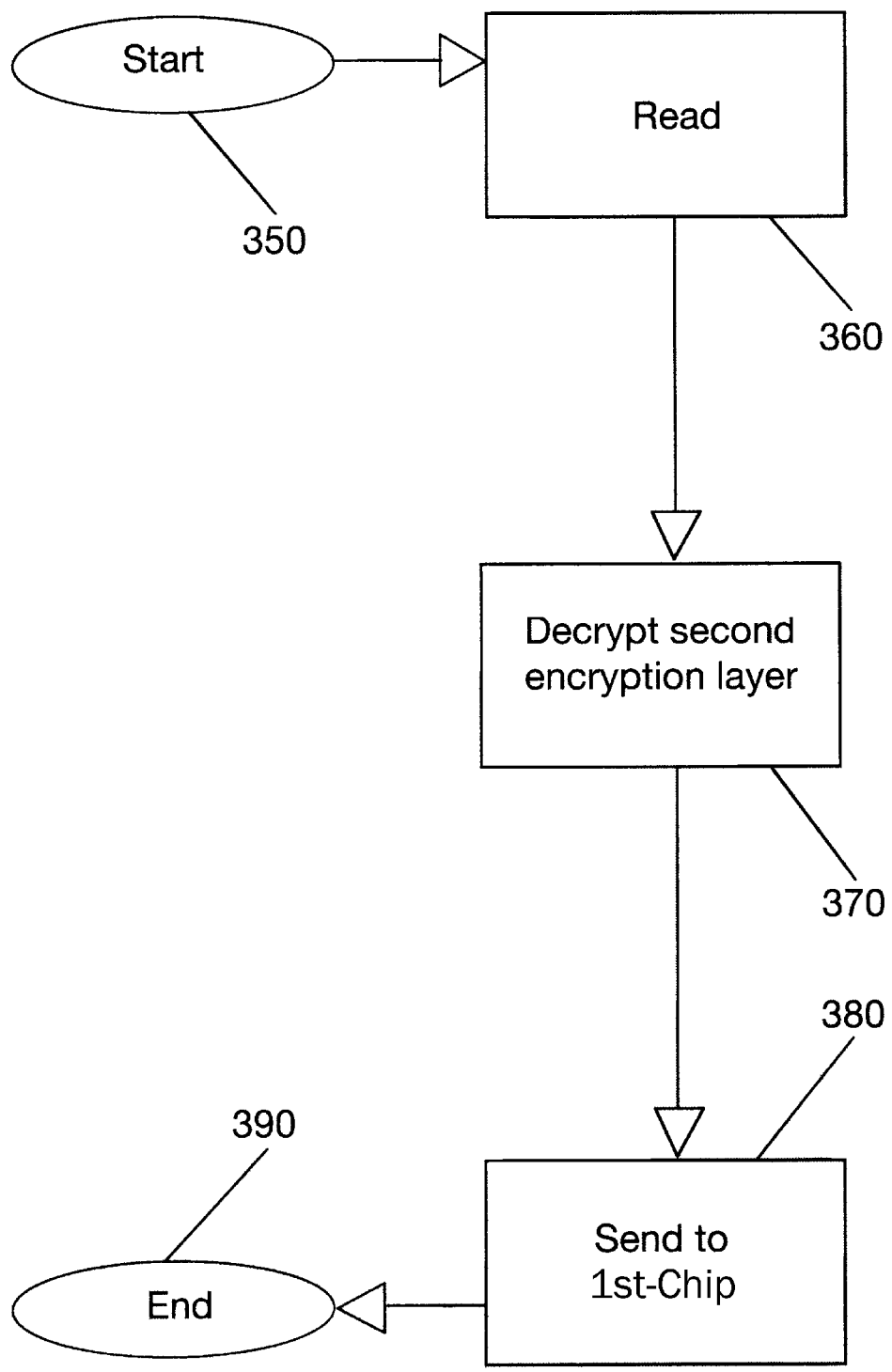

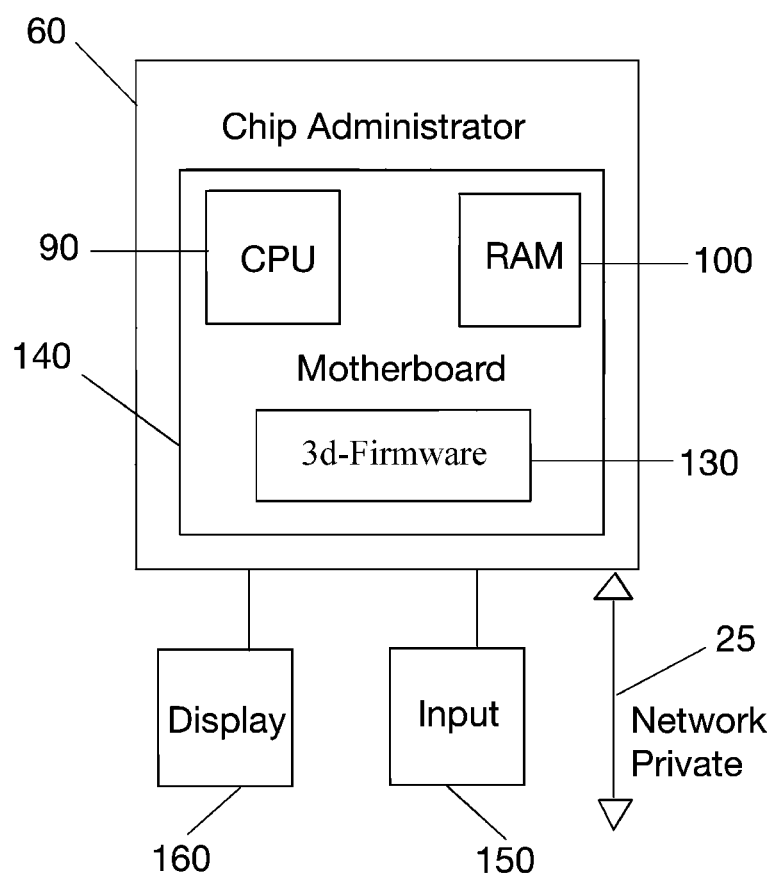
Figure 6 - Chip Administrator

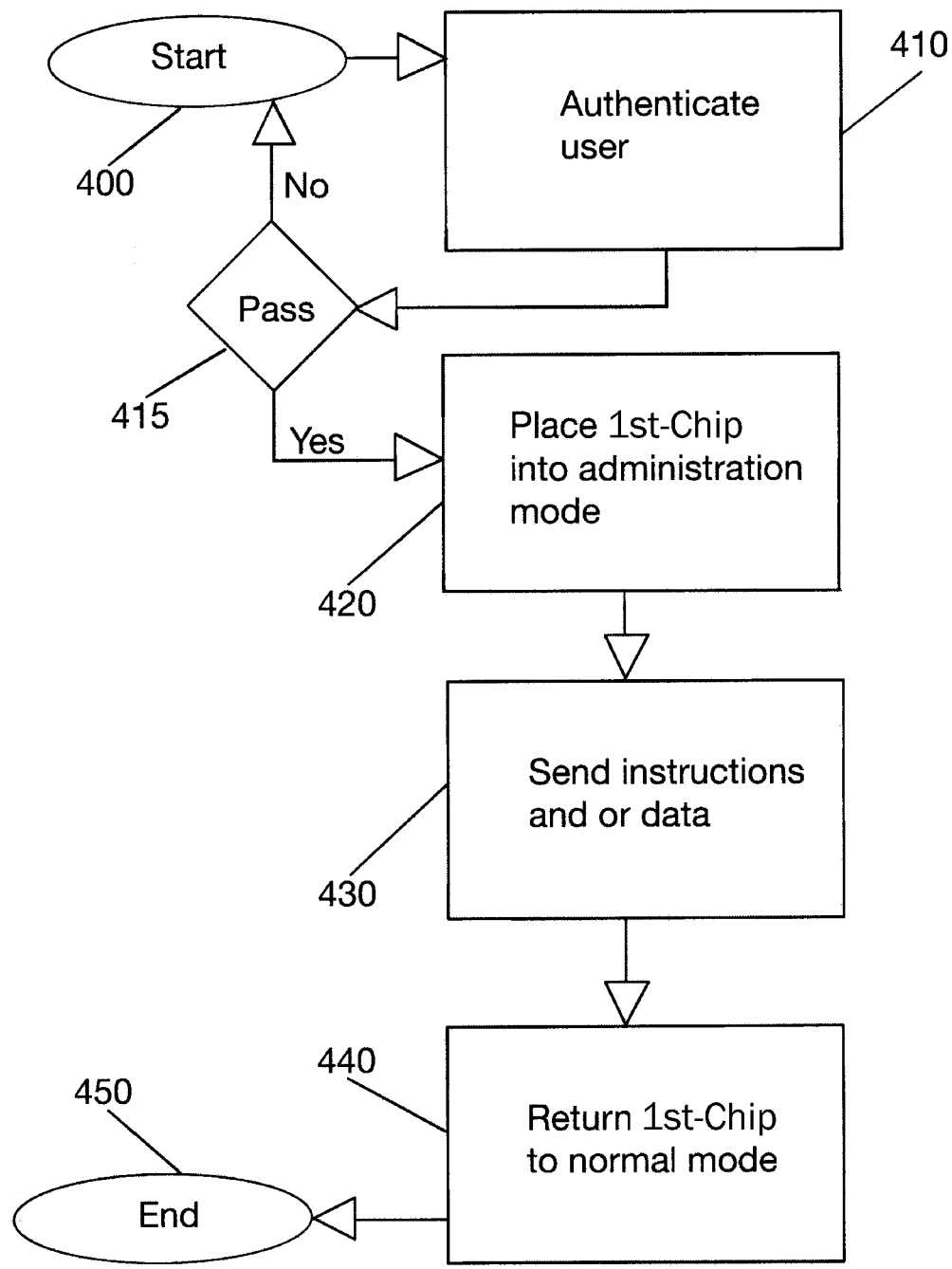
Figure 7 - Chip Administrator Logic

DISTRIBUTED AND AUTONOMOUS DATA SECURITY AGENT

BRIEF DESCRIPTION OF THE DRAWINGS

FIG. 1 is a schematic overview of the system.

FIG. 2 shows first-Chip (30) architecture and relationship between the Network (20), first-Chip (30) and second-Chip (50).

FIG. 3a is a logic diagram showing first-Chip (30) modifying the data before sending it to second-Chip (50).

FIG. 3b is a logic diagram Showing Data coming from second-Chip (50) to first-Chip (30) which is modified by first-Chip (30) and sent to a P.C. (10).

FIG. 4 shows second-Chip (50) architecture and relationship between the Storage Device (40), second-Chip (50) and first-Chip (30).

FIG. 5a is a logic diagram showing second-Chip (50) modifying the data and or command before sending it to the Storage Device (40).

FIG. 5b is a logic diagram showing second-Chip (50) reading data from the Storage Device (40) and modifying to before sending the data to first-Chip (30).

FIG. 6 shows the architecture of the Chip Administrator (60) and its relationship with the Private Network (25).

FIG. 7 is a logic diagram showing the basic function of the Chip Administrator (60).

TABLE OF FIGURE REFERENCES

10—P.C.
20—Network Public
25—Network Private
30—first-Chip
40—Storage Device
50—second-Chip
60—Chip Administrator
70—Data Cable
80—Server
90—CPU
100—RAM
110—first-Firmware
120—second-Firmware
130—third-Firmware
140—Motherboard
150—Input
160—Display
170—Start first-Chip Input Logic
180—Convert Data
190—Check Allocation
200—Encryption
210—Send to second-Chip
220—End first-Chip Input Logic
230—Start first-Chip Output Logic
240—Decrypt
250—Convert for O.S.
260—Send to P.C.
270—End first-Chip Output Logic
280—Start second-Chip Input Logic
290—Check for Versioning
300—Encryption
310—Data Command
320—Update first-Chip Allocation
330—Update Local Allocation
340—End second-Chip Input Logic
350—Start second-Chip Output Logic
360—Read
370—Decrypt
380—Send to first-Chip
390—End second-Chip Output Logic
400—Start Chip Administrator Logic
410—Authenticate User
415—Pass
420—Initiate Administrator Mode
430—Send Instructions and or Data
440—Return to Normal Mode
450—End Chip Administrator Logic

DETAILED DESCRIPTION OF THE INVENTION

Referring now to the drawings, the details of preferred embodiments of the present invention are graphically and schematically illustrated. Like elements in the drawings are represented by like numbers, and any similar elements are represented by like numbers with a different lower case letter suffix.

The present invention is a distributed and autonomous data security agent that secures digitally stored data, as well as the storage device itself, from remote manipulation. The present system of data storage security is an "agent" in that it acts independently in the accomplishment of its objects. It is distributed in that its functionality is resides on firmware resident at disparate hardware locations. The agent is autonomous in that it cannot be remotely compromised—even by an administrative user.

FIG. 1 is a schematic drawing providing an overview of the present distributed and autonomous data security agent practiced in a computer server system. As illustrated in the figure, a plurality of PCs 10 connect to a network public 20 allowing the PCs 10 access to a plurality of storage devices 40 residing in a server 80. The server 80 has a first-Chip 30 which independently applies the present methodology to the data stream before forwarding it, via a data cable 70, to second-Chip 50. Second-Chip 50 applies additional methodology to the data before committing the data to the storage device 40. Both first-Chip 30 and second-Chip 50 are independent of the traditional server 80 system. The methodology they apply can not be seen or bypassed by the PCs 10. Only the Chip Administrator 60 via a network private 25 can see first-Chip 30 and communicate with it. No element of the system's Network Private 25 and/or Network Public 20 can see or influence (hack) second-Chip 50, which acts autonomously of the present system preventing any corruption of its second-Firmware 120. Since both first-Chip 30 and second-Chip 50 can not be seen or influenced by the PCs 10 or the network public 20, they can both apply the methodology to protect the data from corruption, hacking, etc. in a two stage process.

As illustrated in FIG. 2, first-Chip 30, which resides in the server 80 sends and receives data from the network public 20. The PCs 10 which communicate with the server 80 are unaware that first-Chip 30 is applying the methodology (applying rules for handling data, reformatting the data, encrypting, etc.) via code from first-Firmware 110 of first-Chip. Since first-Chip 30 has its own CPU 90 and RAM 100, it is able to modify the incoming or outgoing data as it is directed by the methodology to ensure the data are protected. Because first-Chip 30 is abstracted from the Network Public 20, there is no access vector for attack on first-Chip 30. After first-Chip 30 has applied its methodology to the data, in a preferred embodiment it uses a data cable 70 to send the data to second-Chip 50 which communicates with the storage device 40.

FIG. 3a shows the Start 170 of first-Chip's 30 input logic. As illustrated, when first-Chip 30 receives incoming data from the Network Public 20 it Converts 180 the incoming data from a traditional format (e.g., NTFS, HFS+, EXT 4, etc.) into a proprietary format and applies any rules (send data to a specific storage device 40, send copies to multiple storage devices 40, etc.) according to the processes established for it—the first-Chip methodology. first-Chip 30 then Checks 190 a pre-allocation table to determine which data storage device 40 to route the data to but does not itself directly cause data to be stored. Additionally, first-Chip 30 can add an encryption layer 200 to the data to be stored. After first-Chip 30 is finished applying its methodology to the incoming data, it Sends 210 the now first-Chip modified data to second-Chip 50, thus Ending 220 its manipulation of incoming data and sending it for storage.

Conversely, as shown in FIG. 3b, the output logic of first-Chip 30 is set forth. Receiving previously stored first-Chip modified data from second-Chip 50 via the data cable 70, initiates the Start 230 of first-Chip's 30 output logic. The recalled/previously stored first-Chip modified data received from second-Chip 50 is Decrypted 240 and Converted 250 from its proprietary format back into the format that the PC 10 is expecting to see (i.e., into the same format in which it was originally transmitted by the PC 10). The now reconstituted outgoing data is then Sent 260 to the PC 10 requesting the data, thus Ending 270 first-Chip's application of its methodology to the outgoing data.

As illustrated in FIG. 4, second-Chip 50 resides on storage devices 40 of the storage device array of the server, and receives first-Chip modified data from first-Chip 30 via the data cable 70 connection. Second-Chip 50 applies its methodology to the first-Chip modified data and sends the now second-Chip modified data to the storage device 40. Additionally, second-Chip 50 can retrieve data from the storage device 40, remove the second-Chip modified methodology (i.e., removing the second-Chip modification from the second-Chip modified data) and sending the now first-Chip modified data via data cable 70 back to first-Chip 30 for processing and output. second-Chip 50, having its own CPU 90 and RAM 100, is enabled to apply its methodology as coded in second-Firmware 120 fully independent of any other system component. Second-Chip 50 is extracted from the whole of the system of FIG. 1, and no element or feature of the system's Network Private 25 and/or Network Public 20 can see or influence (hack) second-Chip 50. This ensures that second-Chip's fully independent control over the data it stores on the storage device 40 is never compromised.

Turning now to the functional operation of second-Chip 50, FIG. 5a shows the Start 280 of second-Chip's input logic methodology. When second-Chip 50 receives first-Chip modified data via the data cable 70, it Checks 290 for previous versions of the first-Chip modified data in the second-Chip modified data on the storage device 40. If necessary second-Chip 50 will exercise versioning of associated data on the storage device 40. Second-Chip 50 then may apply an optional Encryption 300 layer to the received first-Chip modified data. Second-Chip 50 then executes the methodology 310 (i.e. copy, delete, read, write, move, etc.). Once these logic steps have been followed, second-Chip 50 calculates as necessary the amount of available data that the storage device 40 will have and send the updated amount to the pre-allocation table of first-Chip 30. This allows first-Chip 30 to allocate data, based on each of the storage devices' 40 true remaining available storage capacity. While first-Chip 30 is in a "normal" mode (normal mode versus administration mode is explained below), second-Chip only reports the current version of any given piece/set of data and hides the previous versions, if any. It also tags files as deleted, but does not actually delete them outside of its own rule set. Without this feature, the PC's 10 and first-Chip 30 would miscalculate available storage, absent having second-Chip report the available storage to first-Chip's pre-allocation table. In view of the pre-allocation table, first-Chip has no confusion as to which storage device has an adequate amount of available storage for any given task, and connected PC's 10 will report correct storage amounts to a user. Once the pre-allocation data is sent to first-Chip 30, second-Chip 50 updates its own allocation table 320 on the storage device 40 to which it is assigned. This Ends 340 the methodology of second-Chip's 50 input logic.

Conversely, second-Chip's 50 output logic is shown in FIG. 5b. The output logic methodology Starts 350 when a Read 360 request is received from first-Chip 30. After receiving the data read request, second-Chip 50 Reads 360 the latest second-Chip modified version of the requested data from the storage device 40. Any encryption layer or other second-Chip modification is removed by the Decrypt 370 process and the data is Sent 380 as recalled first-Chip modified data to first-Chip 30 via a data cable 70. This Ends 390 second-Chip's output logic methodology.

FIG. 6 is a schematic giving an overview of the functionally and I/O features of the Chip Administrator 60 of the distributed, autonomous data security agent. The Chip Administrator 60 consists of a motherboard 140, a CPU 90, a RAM 100, and third-Firmware 130. The Chip Administrator 60 may be directly connected to any number of input devices 150 (i.e. biometric devices, keyboard, mouse, etc.), and to a display device 160, to give the user a visual representation of their interactions with the Chip Administrator 60. The Chip Administrator 60 is connected to a Network Private 25 which allows the Chip Administrator 60 to interact with one or a plurality of first-Chips 30.

FIG. 7 shows the Chip Administrator 60 logic. The authentication process Starts 400 when a user attempts access by Authenticating 410 the user via any of a myriad of known authenticating means (e.g., username & password, biometrics, etc.). Once the user has been through Authentication 410 and Passed 415, one or more first-Chips 30 are put into an Administrative mode 420. Administration Mode 420 allows actions that are not permitted by the system's Normal Mode (changing file versions, seeing files that second-Chip 50 has marked as deleted, etc.). It is important to note that even though the Chip Administrator can see the true state of the storage device 40, it is unable to issue commands directly to second-Chip 50. The Chip Administrator can only authorize first-Chip 30 to send administrative commands to second-Chip 50. Once in Administration Mode 420, the Chip Administrator 60 can send instructions and data 430 (i.e., software updates, version modifications, etc.) to first-Chip 30 which in turn will be sent as "acceptable" commands to second-Chip 50. When the user is finished administration of the system, they can exit the Chip Administrator 60 and the first-Chips 30 will return to normal mode 440, thus Ending 450 the Chip Administrator 60 logic methodology.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. A computer server secured data storage system having a distributed and autonomous data security agent, the system comprising:

a computer server in data communications with a data storage array consisting of a plurality of data storage devices;

the computer server having a dedicated Network Private link in communication with a Chip Administrator, a Data Link between a first-Chip and a second-Chip of said distributed and autonomous data security agent, the first-Chip resident and operable in the computer server and being a firmware device running a first-Firmware methodology, the methodology managing, controlling, and/or processing Write/Read calls and data transfers between the computer server and the second-Chips of the data storage array;

the data storage devices of the data storage array each having a second-Chip of the distributed and autonomous data security agent resident and operable in the computer server and being a firmware device running a second-Firmware methodology and managing, controlling, and/or processing data transfer between the first-Chip of the computer server and the storage devices of the data storage array;

the Chip Administrator device consists of a mother board, a CPU, a RAM, and a third-Firmware to control an operational mode of the data security agent, to provide administrative access to first-Chip to configure the data security agent; and the Chip Administrator, first-Chip and second-Chip in combination with their associated Firmwares providing said distributed and autonomous data security agent of said computer server secured data storage system.

* * * * *